United States Patent
Brückner

(10) Patent No.: US 6,208,992 B1
(45) Date of Patent: Mar. 27, 2001

(54) INFORMATION SYSTEM AND PROCESS FOR STORING DATA THEREIN

(75) Inventor: Annette Brückner, Markt Indersdorf (DE)

(73) Assignee: Genesys Software-Entwicklungs-und Produktions-GmbH, Unterschleissheim (DE)

( * ) Notice: Subject to any disclaimer, the term of this patent is extended or adjusted under 35 U.S.C. 154(b) by 0 days.

(21) Appl. No.: 09/051,394

(22) PCT Filed: Sep. 12, 1996

(86) PCT No.: PCT/DE96/01719

§ 371 Date: Dec. 1, 1998

§ 102(e) Date: Dec. 1, 1998

(87) PCT Pub. No.: WO97/15015

PCT Pub. Date: Apr. 24, 1997

(30) Foreign Application Priority Data

Oct. 13, 1995 (DE) .............................................. 195 38 240

(51) Int. Cl.[7] ..................................................... G06F 17/30
(52) U.S. Cl. ............................................. 707/100; 707/104
(58) Field of Search ..................................... 707/100, 101, 707/102, 103, 104

(56) References Cited

U.S. PATENT DOCUMENTS

| | | | |
|---|---|---|---|
| 4,864,497 | * 9/1989 | Lowry et al. ........................ | 707/100 |
| 5,548,749 | * 8/1996 | Kroenke et al. ..................... | 707/100 |
| 5,611,076 | * 3/1997 | Durflinger et al. .................. | 707/103 |
| 5,615,367 | * 3/1997 | Bennett et al. ...................... | 707/103 |
| 5,713,014 | * 1/1998 | Durflinger et al. .................. | 707/4 |
| 5,809,297 | * 9/1998 | Kroenke et al. ..................... | 707/102 |

* cited by examiner

Primary Examiner—Thomas G. Black
Assistant Examiner—Frantz Coby
(74) Attorney, Agent, or Firm—Rabin & Champagne, P.C.

(57) ABSTRACT

In a process for storing data from a database in a store of an information system, wherein access to the database is possible via a program running in an EDP system, the structure of the data stored in the database is built up by the following process steps: storing a plurality of objects representing images of concrete or abstract objects in a first store region; storing a plurality of relations between the objects in a second store region; storing a plurality of characteristics for describing the objects and the relations between them in a third and fourth store region; storing a plurality of connections between the objects and the characteristics in a fifth store region; and storing a plurality of connections between the relations and the characteristics in a sixth store region, where the six regions represent physically or logically bounded store regions. The invention also relates to the corresponding data structure and an information system.

13 Claims, 7 Drawing Sheets

INFORMATION SYSTEM AND PROCESS FOR STORING DATA THEREIN

Figure 1:
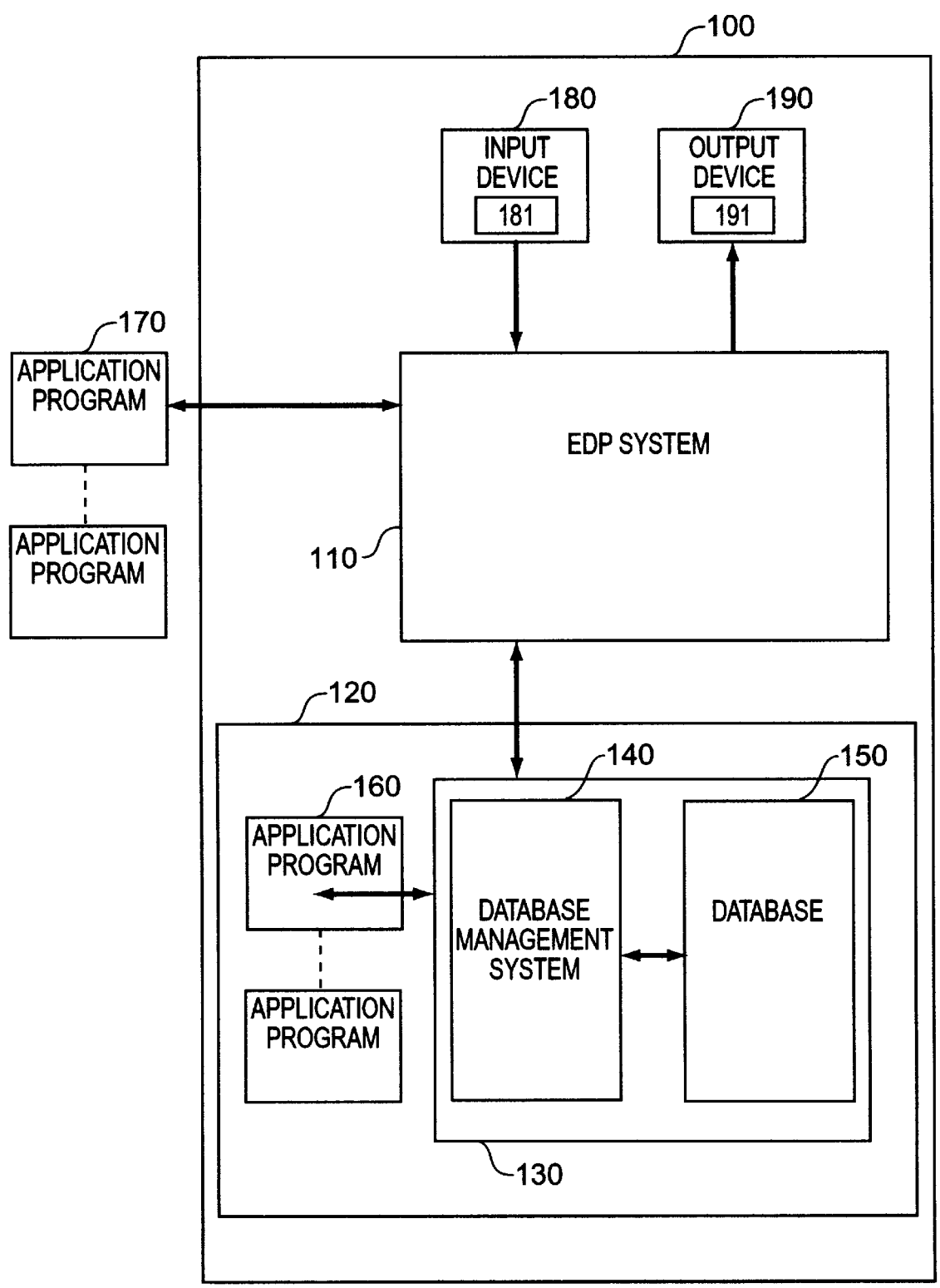

The invention concerns an information system, a process for storing data from a database in a store of an information system, wherein access to the database is possible via a program running in a dp system, and a data structure.

The term information system refers to a system for the entry, storage, processing/linking, representation, retrieval/evaluation and output of information or data. This type of system consists of a dp system, a database system, a database management system and application programs and evaluation programs which are able to access the information system, as well as input and output devices.

According to Duden's "Informatik", 1993, pages 157 ff., the term database system, or database for short, refers to a system used to describe, store and retrieve large quantities of data that can be used by several application programs. The database system consists of a database in which data can be stored, as well as management programs which can store, process, evaluate and retrieve the data according to the specified descriptions.

According to Candace C. Fleming and Barbara von Halle on page 11 of their "Handbook of Relational Data Base Design" published in 1989 by Addison-Wesley Publishing Company, the term data modeling refers to a process used to design correct, consistent and flexible databases that can be accessed by several users simultaneously using any database technologies.

The quality of a database depends mainly on the quality of its data modeling and the resulting logical and physical data structures. For this reason, effective data modeling has been an important development and research objective for many years.

In 1977, for instance, ANSI, the American National Standards Institute (ANSI/X3/SPARC Committee) developed a set of requirements for database systems. These requirements distinguish between the following three design stages for data modeling in a database system (Fleming, v. Halle, pages 18 ff.):

(1) External schema: A way of looking at the data, description of the data structure and the required editing and processing rules from the point of view of an user or programmer and with his/her requirements in mind (according to Thomas A. Bruce, "Designing Quality Databases with IDEF1X Information Models", Dorset House Publishing, 1992, p. 532).

(2) Internal schema or physical model: An arrangement of the data in a physical model in accordance with the internal (physical) access logic of the database management system, e.g. in relational, sequential, hierarchical or otherwise structured database systems (Bruce, p. 543).

With existing data modeling solutions, a physical model describes objects or entities—which can be persons, items, places etc.—attributes (also known as properties or characteristics) of the objects and of the relationships of the objects to each other. All the information in a database, i.e. both the objects and their relationships, as well as the attributes of objects and/or relationships are represented by tables, e.g. in a relational database.

(3) Conceptual schema: An integrated view of the data required and processed in the overall business environment, regardless of its physical arrangement and storage (as represented in the physical model), and regardless of how it is viewed by users and/or programmers (as represented in the external schema) (Bruce, p. 529).

In the case of existing data modeling solutions, the data structures and the access and processing applications in the conceptual schema are derived from a concrete task within a project, e.g. creation of a merchandise management system. Concrete business activities and the anticipated data to be processed at implementation are used to identify or describe the objects to be processed (business rules).

In compliance with the requirements of the data modeling procedure, it is thus essential to develop at least the above-mentioned three different logical (external and conceptual schemata) or physical models when designing a database system.

This is described by Fleming and von Halle, pages 20 ff. In the internal schema, a separate table is defined for each important object (cf. pages 280 ff.). These objects are stored together with their most important attributes in tables of varying structure. This means that there are at least as many object tables as there are objects. This in turn means that object tables of varying structure are created on account of the different object attributes or different relationships between objects they contain. Each table has to have its specific input, access, modification and deletion algorithms.

An extension of business activity or the need to add data at a later date involves the modification or extension of all the data structure models. This always goes hand in hand with a redesign of the (physical and logical) database structure, i.e. with appropriate modeling and restructuring cost and effort. It also involves what is often an extremely complex and cost-intensive modification of the application programs by programming experts insofar as the external viewpoint and modified editing and processing rules are affected. Each small modification of the logical and physical data structure involves changing the access and processing algorithms.

The implementation times for subsequent modifications of this type do not in the least correspond with the necessary operative requirements as regards the availability of information.

The exchange of data between information systems of varying structure is only possible on the basis of the "lowest common denominator", i.e. of the small amount of corresponding data, if at all, and only then if the data for describing similar objects, attributes and relationships is structured in a similar way.

Prior art allows storage of only those attributes whose meaning—defined by the appropriate field (=column) in the appropriate object table—is pre-specified. The attributes have fixed links to certain object types, as the attributes are only stored for a specific object type in the fields (columns) of the table. The data to be stored later has to be provided for and implemented in full as early as at the data structure creation stage. Information contents with changing or unpredictable data structures either cannot be supported at all, or only in a rudimentary fashion.

Relationships between objects are not much different: They can only be linked with each other if the relationships between the objects were defined when the database structure was created.

Prior art allows for attributes with fixed links to certain relationships, as the attributes can only be stored for a certain relationship in the fields (columns) of the table.

Different processing rules for objects—the result of organizational, dp or security requirements—are applied to each individual object table or relationship table. This means that the cost and effort involved in implementing these rules and monitoring their correct functionality increases at least at the same pace as the number of tables.

Prior art allows for the development of information systems or data structure models and the resulting dp applications for the entry, storage, processing, evaluation and output of information to be defined and resolved in a highly task-oriented manner. This goes back to the prevailing school of thought on database design, as described e.g. in the manual by Fleming and von Halle, as well as to the requirements profiles (invitation to tender software, specification sheets) of information system operators.

However, information systems structured in such a specific way lead to high expenditure on development, redesign, programming, maintenance and support.

In contrast to the above, the objective of the invention is to create an information system, a process for storing data and a data structure which avoid the disadvantages of prior art and enable extensions to be made to the information system or database as required, even at a later date.

Another objective of the invention is to allow the stored data to be combined as far as possible.

A further objective of the invention is to allow accessing of information systems of varying contents and for varying tasks (business rules) using uniform access and transaction algorithms.

Another objective of the invention is to create the data structure in such a way as to enable access algorithms to be used regardless of the physical data structure.

Yet another objective of the invention is to allow efficient use of physical storage.

The invention is described in more detail in the patent claims.

The invention provides an universal, physical structure of a data model which (in a partial system, see below) allows any type and number of objects to be entered, stored, processed and evaluated, these objects to be linked with any type and number of attributes and thus to be identified or described, any type of object to be linked to any other type of object, and these object links in turn to have any type and number of attributes assigned to them, in order to be able to identify and describe the object links.

The invention guarantees that even objects (or their attributes and relationships), or the attributes of relationships that could not be foreseen when the data model was structured or the database created, can be entered, described, linked to each other and evaluated in the database.

By using an universal, physical model, the invention avoids the disadvantage of prior art, which insists on gearing the data structure specifically to the concrete tasks in each case, and which entails complex, task-oriented implementation of the input, processing/evaluation, transaction and output algorithms. This allows accessing of information systems of varying contents and for varying tasks using uniform access and transaction algorithms. The access and transaction algorithms are independent of the data structure, as the user does not have to know in which table specific contents are situated. He/she only has to know which element is being dealt with.

The invention also allows effective use of the physical store, as, in contrast to common systems, only those storage areas (table fields or columns) which are really used are "occupied".

The invention allows various logical views, or logical views which can subsequently change (corresponding to the external or conceptual schemata) to be implemented via subsequent modification of editing and processing algorithms at application program level, without having to adapt the basic transaction and access algorithms to the physical data structure.

In cases where access protection, organization, business, dp, application technology and so on necessitate the implementation of various business rules, the invention allows objects which have to processed in different ways, their attributes, relationships and attributes of relationships to be grouped as object classes, with its own partial system being introduced for each object class. However, a main feature of the invention is that all partial systems must have identical physical data structures, allowing them to be edited using identical transaction algorithms at system level for the entry, processing and evaluation, modification, output and deletion of information. In contrast to the above, various processing rules in the above sense are implemented between various object classes (=partial systems) at a higher implementation level, e.g. via programs of the database management system or application programs.

The invention concerns an information system, and, in particular, a process for the entry, storage, processing, evaluation, representation and output of information regarding the existence or assumed existence of any objects, the descriptive and/or identifying attributes of objects any type and number of relationships between any type and number of objects, the descriptive and/or identifying attributes of relationships between objects on storage and processing systems (e.g. relational database systems, RDBMS) suitable for this purpose.

The invention assumes that all the information contents can be traced back to the following three basic elements:

objects, attributes and relationships between objects.

Each of these basic elements is stored in its own, physically delimited storage area (e.g. a separate table in a relational database).

Objects represent things we perceive, recognize and think, being as such illustrations of concrete or abstract items of everyday life. Objects are not items in themselves, but representations of items.

The invention allows objects to be grouped as logical object types. An object type refers to a group of similar objects (e.g. persons, vehicles, book titles), or is used generally to mean a group of objects, the attributes and/or relationships of which are to be compared with those of other objects of the same object type.

The list of object types to be processed is stored in a thesaurus list for object types (object type list). This list can be modified and extended by the information system operator at any time. This involves neither further programming, nor changes to the structure of the database.

The invention allows any objects of any object types to be stored in an uniform structure in a single basic table for objects. The process places no restrictions on the number of objects in the basic table for objects. This means that, when an object is accessed, i.e. an entry made in the object table, the access and processing algorithms only have to be defined once, and that they can then be applied to all the objects.

Attributes are identifying and/or descriptive properties of objects or of relationships between objects.

In accordance with the invention, each attribute consists of two components:

an attribute term, which is used to describe the contents of an attribute and an attribute meaning.

As identical attribute terms with different meanings can be used ("table"=piece of furniture, "table"=systematic arrangement of data), each attribute term is accompanied by an attribute label containing its meaning.

The attribute meaning specifies the meaning to be applied to the attribute term during its subsequent processing, evaluation and output. It is an assessment of the attribute term by the author.

In accordance with the invention, the attributes are stored in their own basic table of attributes.

Each attribute, consisting of the attribute term and attribute meaning, is stored precisely once in the basic table of attributes, with no restrictions being placed on the number of attributes stored. The diversity of attribute terms or attribute meanings is just as unlimited as the options for combining term and meaning.

Both the entry and allocation of terms and the entry and allocation of attribute meanings can be controlled by individual thesauri.

The invention enables any objects of any type to be placed in relation to one another in order to be able to enter, store, process and evaluate relationships, dependencies, causalities, interactions and any other relationships between objects in terms of time or space. Relationships between objects are stored in a separate basic table for relationships. The process does not restrict the number of entries which can be made in this basic table.

The invention enables any type or number of identifying and descriptive attributes to be allocated to each object. It creates a link between the object key and the attribute key in a separate link table, with the process placing no restrictions on the number of entries which can be made in this table.

The invention enables any type or number of identifying and descriptive attributes to be allocated to each relationship between objects. It creates a link between the relationship key and the attribute key in a separate link table, with the process placing no restrictions on the number of entries which can be made in this table.

The invention groups all object types which are subject to the same business rules as regards organization, dp, data protection laws etc. in a logical object class. Objects, attributes of objects, relationships between objects and attributes of object relationships which belong together in an object class are stored in a partial system. The physical data structure of all partial systems is identical, allowing the same transaction and access algorithms to be used for each partial system. Differing business rules (e.g. for data protection, data monitoring and data logging) are implemented in processing algorithms used specifically for the respective purpose. Such changes to the business rules can be undertaken once and centrally without having to change the physical data structure.

The required links between two partial systems are stored in a link table between these partial systems, with the keys of the objects from both partial systems being used as foreign keys in the link table.

The link tables between partial systems are also subject to uniform and centrally defined access and processing algorithms.

The process places as few restrictions on the number of partial systems within an overall system as it does on the number of required link tables between partial systems, the objects of which are placed in relation to one other.

The basic elements of the process—objects and attributes, as well as the relationships between objects—described above can be viewed as entities in the sense of the entity relationship model. These basic elements/entities are stored in the above-mentioned basic tables, with an individual element of a basic element being represented by its own entry in the respective basic table. Each entry in each basic table has an unique, e.g. numeric key for unique identification within the database.

For representation of the entry at entry and output, each element entry is supplemented by (in general) a statement for the element (e.g. name of the object) or descriptor of the relationship (e.g. "is the father of"). This descriptor acts as a symbolic substitute for the element at entry and output.

In the case of the basic table for attributes, this statement is replaced by the pair consisting of attribute term and attribute meaning.

A basic table can contain additional fields, but this is irrelevant to the process.

Thesaurus lists for attribute terms and attribute meanings, as well as the thesaurus list of object types represent additional entities. These are stored in thesaurus tables. Thesaurus tables are treated in the same way as basic tables.

Link tables are used to store the links or relationships between basic elements. Each entry in a basic elements table passes its unique identifying key field on to the link table. An entry in the link table thus comprises (at least) a pair consisting of the key of the entry from the one basic table and the key of the entry from the other.

The foreign keys transferred from the basic elements table do not together necessarily have to form the unique identifying key of an entry in the link table. Instead, the process enables an additional, separate unique key to be assigned to an entry in the link table. It thus becomes possible to link the same entries from basic tables with each other more than once in a link table (e.g. A is the registered user of the vehicle B; A is the owner of the vehicle B).

The main alternatives for linking basic elements (relationships) are:

1:1

1:N

M:N

According to prior art, three different data structure elements were required to store the keys of the linked elements for these three main alternatives for linking basic elements at the physical data structure level:

In the case of 1:1 links between an entity 1 and an entity 2, entity 1 transfers its key as a foreign key to entity 2, and entity 2 transfers its key as a foreign key to entity 1. Both entities thus have to be extended by one field for the foreign key.

In the case of 1:N links between an entity 1 and an entity 2, entity 2 transfers its key as a foreign key to entity 1; the key refers to each of the N-linked elements from entity 2 in each element of entity 1.

In the case of M:N links between an entity 1 and an entity 2, a separate link table is generated according to prior art. This link table contains the key of the linked element from entity 1 and the key of the element linked with it from entity 2 as the minimum entries for each link.

In the present invention, on the other hand, links between basic elements are stored exclusively in their own link tables, regardless of how many entries of an entity may or are intended to be linked with how many other entries of an entity.

The continuous use of a separate link table guarantees that the most wide-ranging allocation alternative (=M:N) can be represented, and also enables less wide-ranging alternatives (1:1 or 1:N) to be stored in this link table.

By uniformly using link tables between linked entities instead of extending the entities themselves (as was previously necessary for 1:1. or 1:N links), uniform, centrally defined access and processing algorithms can be used, regardless of the actual number of links between two entities. Any restrictions of the linking options necessary e.g. for organizational reasons, can be implemented by application programs running "above" the centrally defined access and processing algorithms.

An entry in the link table can be extended by additional fields. A particular use for such additional fields is to enable the user to identify the entry at entry and output (a "is the father of" B), but also to store information regarding the date on which the entry was created or modified, the date on which it is to be deleted, or information on the creator/last editor of the entry.

Other fields in a link table can, in particular, also be used to evaluate the allocation in more detail, e.g. with regard to its relevance in terms of time (beginning and end of the allocation between book title and borrower=start and end of the lending period), but also with regard to the assessment by the operator as to whether the relationship exists (relationship exists de facto/is fictitious) or to the assessment of the verification status of an allocation (e.g. a witness statement in a police information system).

The invention thus enables information of varying degrees of accuracy or relevance to be stored and yet distinguished from each other in one and the same information system. Information systems based on the present invention can thus be used to develop hypotheses, simulations and scenarios, and to compare these with facts.

The basic table of relationships between objects plays a dual role: It is a basic table and is handled as such. It is also a link table in the sense that it stores the link between two objects (of the same partial system). The table thus combines the advantages of both of the above:

As a basic table, it represents the relationship between objects as an object itself, and enables the relationship to be linked in particular with any identifying and descriptive attributes.

As a link table, it provides a means by which any objects can be connected or linked to any other objects without the need for additional table structures.

Link tables connecting (the objects of) various partial systems have the same structure as the basic table containing the relationships between objects, and thus offer the same advantages.

The following illustrations highlight in more detail several sample applications for the invention:

FIG. 1 Schematic illustration of an information system

Figure 2:
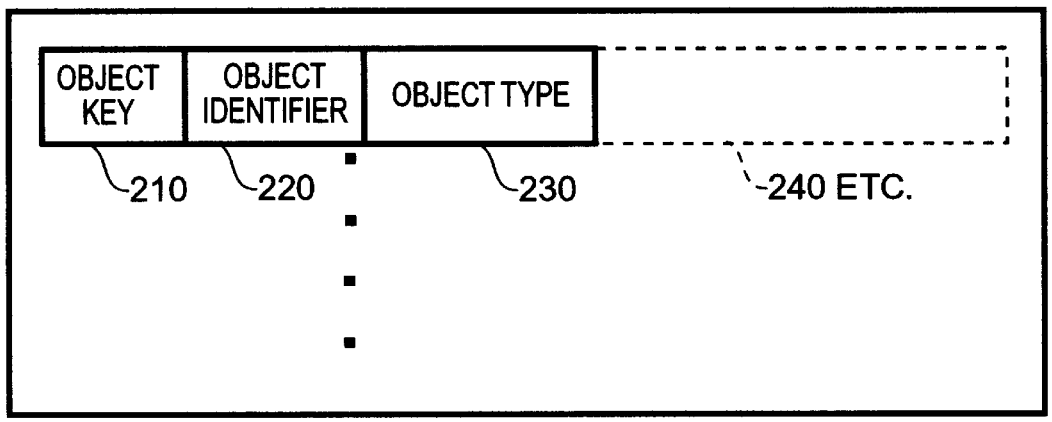
Figure 3:
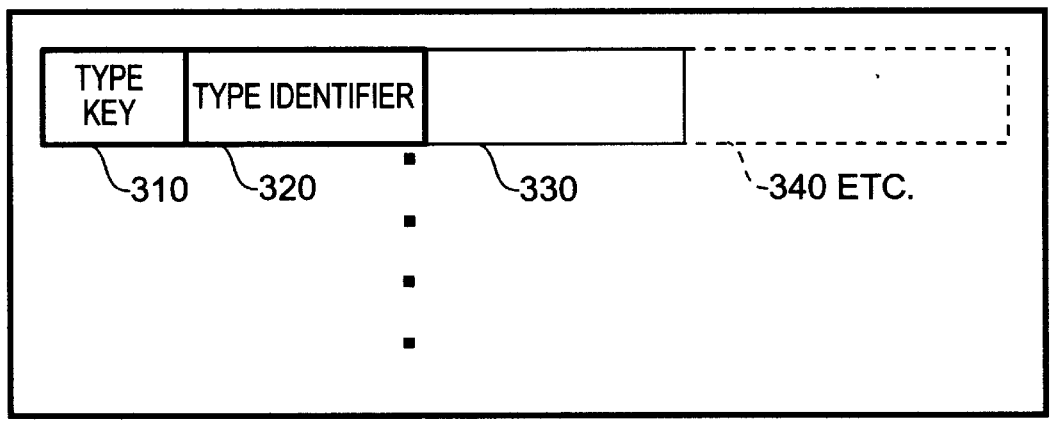
Figure 4:
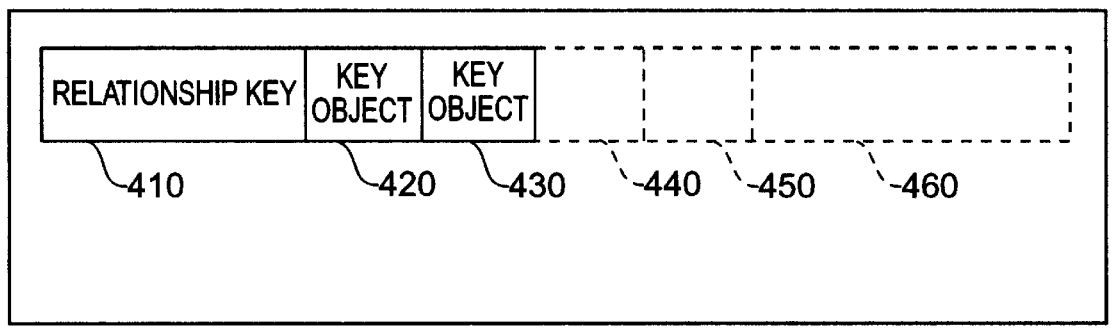
Figure 5:
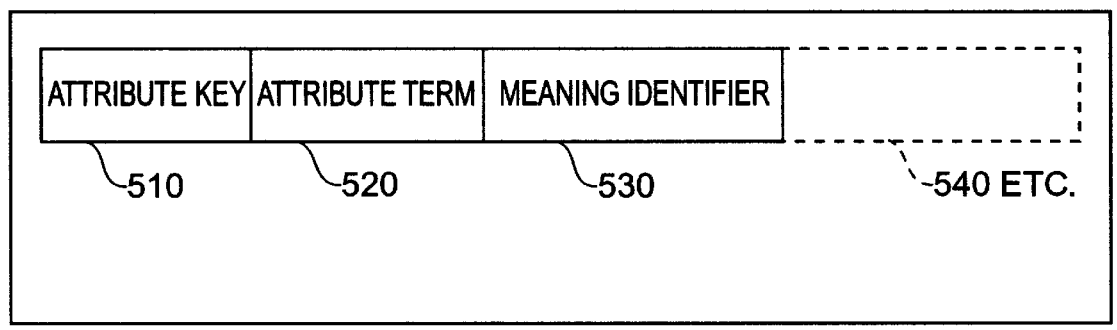
Figure 6:
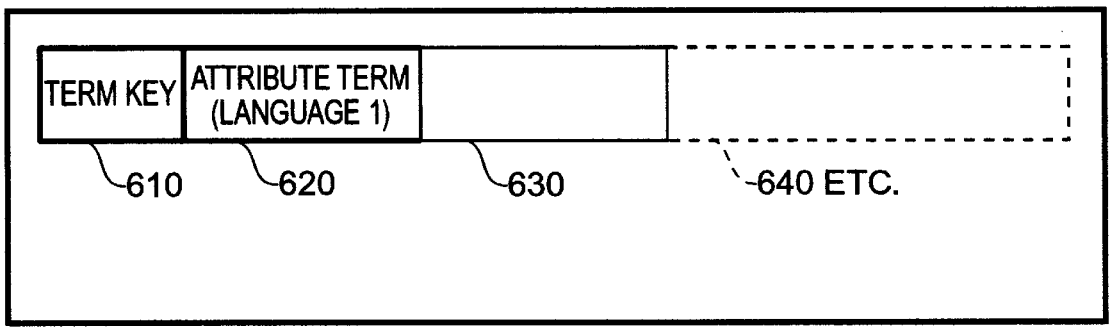
Figure 7:
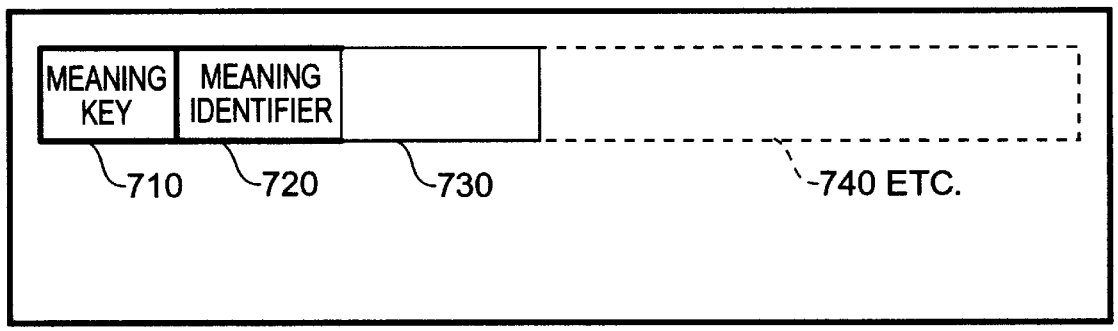
Figure 8:
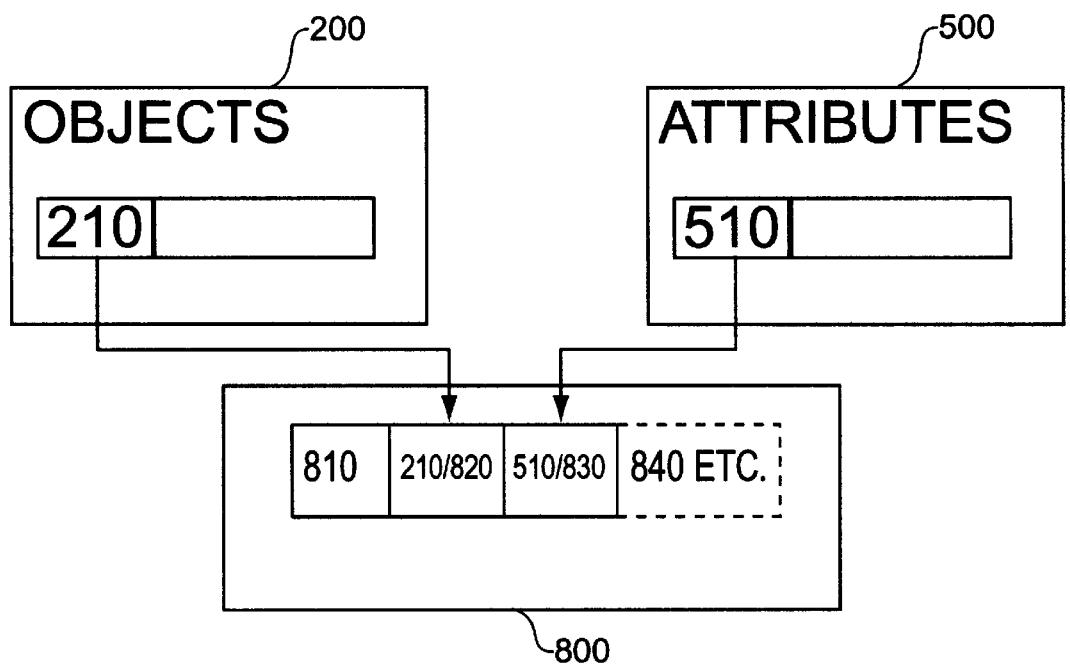

FIG. 2 Structure of an entry in a basic table for objects, as used in an initial sample application for the invention FIG. 3 Structure of a thesaurus list for object types FIG. 4 Structure of an entry in a basic table for relationships, as used in the first sample application for the invention FIG. 5 Structure of an entry in a basic table for attributes, as used in the first sample application for the invention FIG. 6 Structure of an entry in a thesaurus list for attribute terms, as used in a further sample application for the invention FIG. 7 Structure of an entry in a thesaurus list for attribute meanings, as used in a further sample application for the invention FIG. 8 Schematic illustration of how the system stores links between two basic elements (an object and an attribute).

Figure 9:
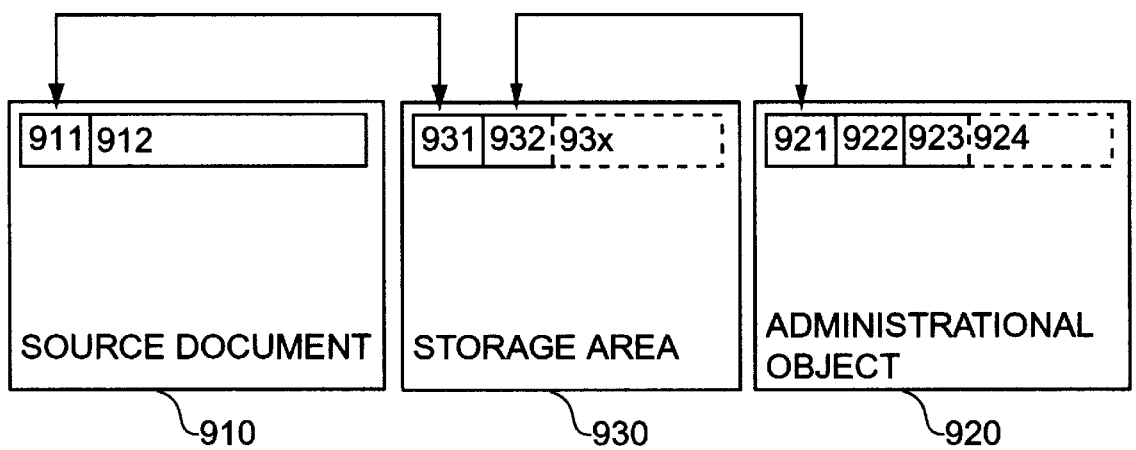
Figure 10:
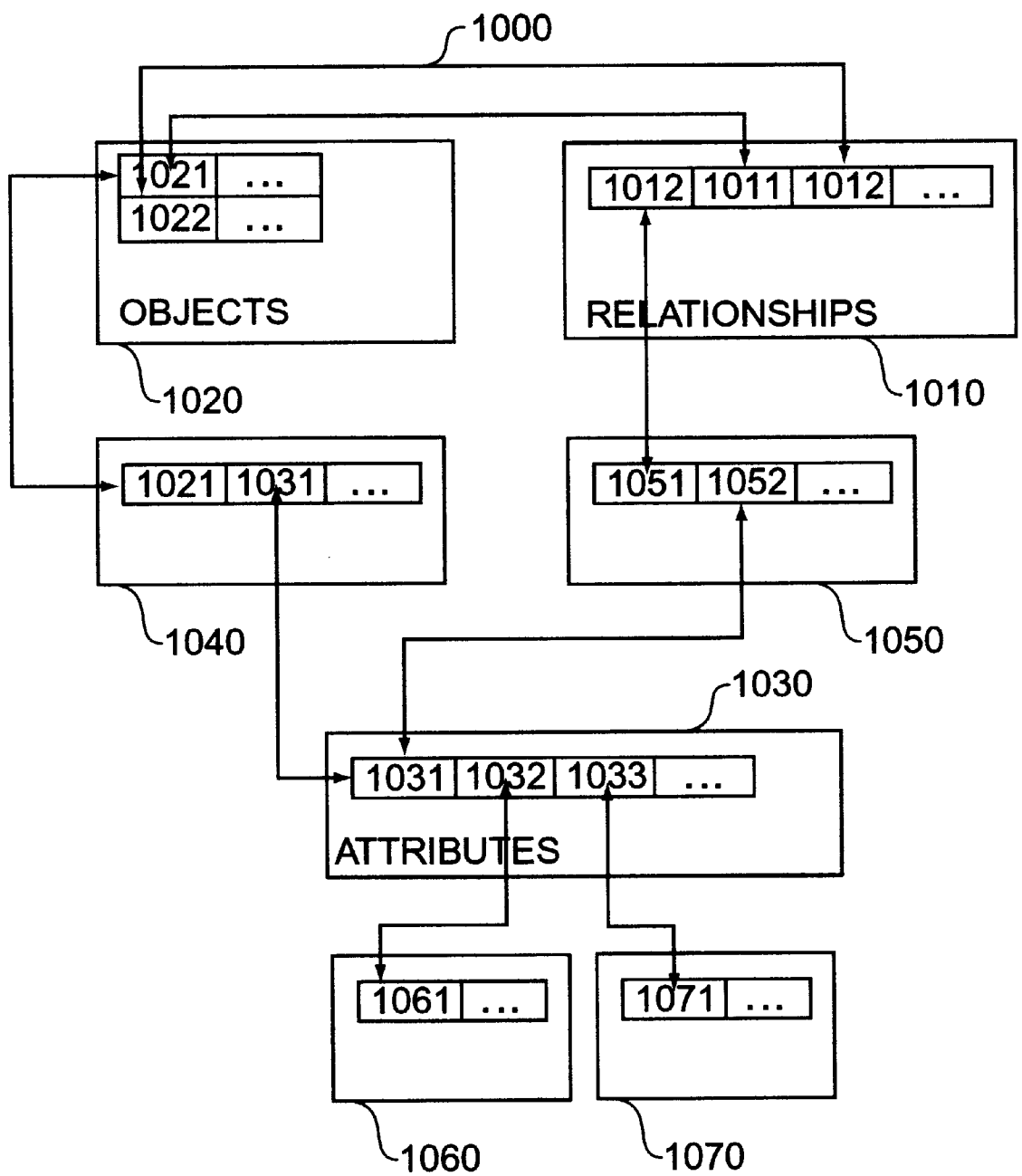
Figure 11:
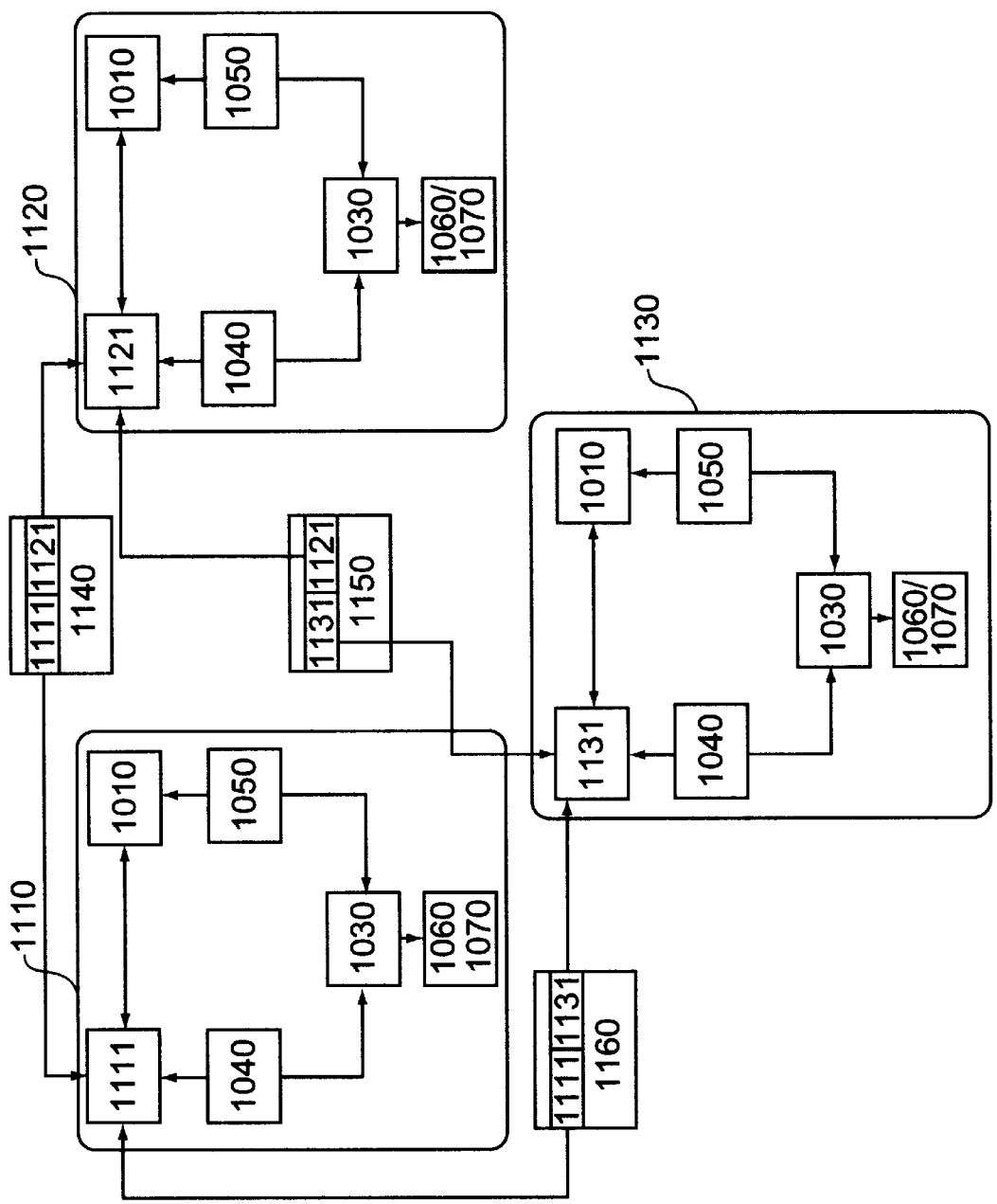

FIG. 9 Schematic illustration of how the system stores links between source documents and management objects, as used in a further sample application for the invention FIG. 10 General illustration of a partial system's data structure in accordance with the present invention FIG. 11 General illustration of a data structure with three partial systems in accordance with the present invention FIG. 1 is a schematic illustration of Information System '100', which is made up of DP System '110' and Storage Component '120'. Storage Component '120'—essentially any machine-readable memory system—accommodates Database System '130'(which in turn consists of Database Management System '140' and Database '150'), and some Application Programs '160'. The application programs are loaded into the CPU of DP System '110' in the usual way, from where they can access Database System '130'. External users are also able to access Information System '100' and Database System '130' via appropriate application programs in the usual way.

The information system also includes Input Devices '180' and Output Devices '190' for inputting and outputting data or information.

In so-called client-server architectures, external users can access Information System '100' or Database System '130' either via Application Programs '181' running on Input Devices '180', or via Application Programs '191' running on Output Devices '190'.

In the present invention, all data or information capable of being processed can be traced back to one of three basic elements:

1. Objects
2. Relationships between objects, and
3. Attributes for describing and/or identifying objects and/or relationships The important thing here is that each basic element is stored in a physically or logically independent area of Storage Component '120', and that each storage area has the same structure for each individual element. In a relational database, these storage areas are e.g. separate tables.

Objects represent things we perceive, recognize and think, being as such illustrations of concrete or abstract items of everyday life.

In the present invention, identical objects, or objects that are to be compared with one another, can be grouped together to form logical object types. Pages 88 ff. of the manual by Fleming and von Halle describes a method by which we are able to identify and capture—as completely as necessary—all the object types we need during the design of a database structure model. This method can also be used in our process in order to identify the necessary object types. Examples of object types:

in a library information system: Persons (users/readers)
    Media (titles of books, records, music CDs, etc.)
in a personnel information system: Persons (staff)
    Organizational units (branches, departments, etc.)
in a police information system: Persons
    Institutions of public law
    Vehicles
    Weapons, ammunition
    Objects (buildings)

The list of object types to be processed is stored in a thesaurus list for object types (type list), as discussed later in more detail. This list can be modified and extended at any time by the operator of the information system. This involves neither further programming, nor changes to the structure of the database.

In a further sample application for the invention, similar groups of object types can be brought together to form an object class, which can then be processed in a separate partial system.

Within a particular partial system, all the objects are stored in one and only one basic table for objects (even though these objects may well belong to different object types).

FIG. 2 shows the structure of an entry in a basic table for objects. Here, an object is represented by entries made in a certain erowí of the table.

An object is represented by an unique key stored in a separate Key Field '210' in the row. An object is named by means of a Descriptor '220'. The descriptor is essentially the objectís erepresentativeí, having the task of naming the object when the latter is first entered. During processing and, in particular during data output, its job is to identify the object for the user.

It is important that different types of object are distinguished from one another in order to ensure that identical objects are entered, processed, and output in the same way. For this reason, each object type is given a separate Type Identifier '230'. This 'foreign key' points to the type list described in more detail in FIG. 3 below.

In individual cases, the entry for a certain object can be extended by adding further Fields '240' etc., should this be deemed expedient or necessary on account of security or other requirements.

These additional field s might include:
information on the object is processing status or availability status
information on the object is creator
information on the object is date of entry/creation
information on the point in time when the object existed
information assessing the object's existence (existence is matter of fact, verified, hypothetically assumed, etc.)
etc.

The list of object types to be processed is stored in a thesaurus list for object types (type list), as discussed later in more detail. This list can be modified and extended at any time by the operator of the information system. This involves neither further programming, nor changes to the structure of the database.

The structure of the thesaurus list for object types is shown in FIG. 3. The individual fields in the list are as follows:

Type Key '310'—an unique, normally artificial key used to identify the object type within the system.

Type Key '310' from the thesaurus list of object types (in FIG. 3) is transferred as Foreign Key '230' to the basic table for objects (in FIG. 2). It is used to identify the object type to which each entry (row) in the basic table of objects belongs.

Type Descriptor '320'(language 1) is a long field that is formatted to the specific requirements of the system operator for storing the descriptor of the object type. Its job is to name the object type in applications, or whenever information is output.

In multi-lingual systems, foreign-language type descriptors can be stored in additional Fields '300' etc. in order to enable users to toggle instantaneously between two or more application languages.

In individual cases, the thesaurus list for object types can be extended by adding further Fields '340' etc., should this be deemed expedient or necessary on account of security or other requirements.

Any number of links or relationships can be established between objects of any type. They enable all manner of interdependencies, causalities and interactions that might exist between objects to be entered, saved, processed and evaluated.

Such links might be used to indicate:
Family relationships (relatives)
Relationships between people and the things they own
A person's abode or his/her whereabouts
A person borrowing a particular book from a library etc.

Relationships are stored in a separate table of basic elements. FIG. 4 shows how an entry in the basic table for relationships is structured.

In the case of a relationship between two objects, the following details will be stored in the fields of a row in the table:

Relationship Key '410', an unique code serving to identify the relationship. This key can take the form of an unique artificial key (e.g. a numeric key) or—provided uniqueness is guaranteed—of a key derived from the key of object 1 and object 2.

Key '420' of object 1 affected by the relationship;
Key '430' of object 2 affected by the relationship;
Description of Relationship '440', as viewed from object 1 to object 2, as an optional statement;
Description of Relationship '450', as viewed from object 2 to object 1, as an optional statement;
Additional Fields '460' etc.: The entry (row) for a relationship can be extended by adding further fields, should this be deemed expedient or necessary for organizational reasons, security requirements or other reasons.

Any additional fields can store e.g.:
information on the processing status or availability status of the relationship,
information on the entry/modification date of this relationship,
information on the creator of the relationship,
information on the time or period of time when the relationship existed,
information assessing the existence of the relationship (existence is matter of fact/verified/hypothetically assumed/etc.)
etc.

In another sample application of the invention, instead of storing descriptions of relationships in accordance with '440' and '450' directly, it is possible to provide them from a thesaurus of relationship descriptions.

Attributes are descriptive or identifying properties of objects and/or relationships between objects. Each attribute consists of two components: an attribute term and an identifier for the meaning of the attribute.

An attribute term is any term capable of being stored and processed that is used as a (symbolic) description of the contents of the attribute. It could relate to:
a statement in any language or using any text symbol (e.g. big/small, red/blue/green, New York/Dallas/Los Angeles)
a numeric value (e.g. 1.80, 80553, 26.08.1995)
a value which consists of neither text nor numbers (e.g. sound pattern, graphics pattern, film or video clip etc.).

The main factor involved in selecting the attribute term according to this definition is its suitability for subsequent comparison with other, similar terms.

As identical attribute terms with different meanings can be used ("table"=piece of furniture, "table"=systematic arrangement of data), each attribute term is accompanied by a label containing the attribute meaning. The attribute label specifies which meaning should be attributed to the attribute term when it is subsequently processed, evaluated and output. It is an assessment of the meaning by the data operator.

Each attribute (pair) is stored precisely once in the basic elements table for attributes. An attribute "Miller: Surname" only occurs once in the register of inhabitants of a town. It is only when it is applied=linked with the object (of the person type) bearing the surname Miller, that it appears as often as there are Millers in the town.

FIG. 5 shows how an entry is made in the basic table for attributes. The entry (row) for an attribute (pair) consists at least of the following fields:

Attribute Key '510': Unique key for the attribute. Depending on access optimization requirements, the key may consist of an artificial key (e.g. numeric identifier in a database system). The key may also consist of the attribute term/attribute label pair itself, which cannot occur more than once in accordance with the structure of the present system.

Attribute Term '520': A long field that is formatted to the specific requirements of the system operator to accommodate the attribute terms or a key reference to the term of the attribute, if the allocation of attribute terms is supported by a thesaurus.

Attribute Label for Attribute Terms '530': A long field that is formatted to the specific requirements of the system operator to accommodate the attribute label or a key reference to the attribute label, if the allocation of attribute labels is supported by a thesaurus.

In individual cases, the entry (row) for an attribute can be extended by adding further Fields '540' etc., should this be deemed expedient or necessary for dp reasons, organizational reasons, security requirements etc.

In order to avoid ambiguity and deviations in spelling in what are essentially identical terms, another sample application of the invention allows the selection and allocation of attribute terms to be supported by a thesaurus (controlled vocabulary). Thesaurus support can be used for either individual terms or for all terms employed. The thesaurus of attribute terms is a thesaurus list which the operator of the information system is responsible for defining and extending, and in which the permitted terms for the attributes of objects and/or relationships are specified.

Sample thesaurus of attribute terms:
Federal States of the USA in an inhabitant registration system
Florida
North Carolina
Washington
Names of departments in a personnel information system
Vehicle or munitions manufacturers in a police information system By specifying a thesaurus for the attribute terms, an operator ensures that different users employ similar attribute terms in a similar way. This enhances subsequent attribute comparisons, as the danger of various attribute terms being employed for one and the same attribute, or of similar attribute terms being spelt differently (or incorrectly) when they are entered, evaluated and output is either reduced or eliminated altogether.

If this type of thesaurus list is maintained, an entry (row) of the thesaurus list consists of the fields shown in FIG. 6, which have the following meaning:

Key Field '610' of the attribute term: An unique key, and, in particular, artificial key for the term. It is used as a reference for the term (foreign key) if this term is employed in Field '520' in the table of attributes.

Term of Attribute (language 1) '620': A long field that is formatted to the specific requirements of the system operator to store what is generally a statement on the attribute which can be understood by the creator, processor and evaluator of the information (e.g. in the case of the Federal States of the USA: Florida, North Carolina, Washington, . . . )

In multi-lingual systems, attribute terms in foreign languages can be stored in additional Fields '630' etc., in order to enable users to toggle instantaneously between two or more application languages.

Additional information can be stored in additional, optional Fields '640' etc., if this is deemed expedient or necessary in individual cases. Additional fields may contain e.g.

Information on the sequence in which attribute terms belonging to one and the same attribute meaning should be displayed (e.g. "Florida", "North Carolina", "Washington" etc.), Information as to whether the term is available to or can be used by specific persons, etc.

In order to avoid ambiguity when entering attributes and assessing their meaning, another sample application of the invention allows the selection and allocation of attribute labels to be supported by a thesaurus. This is a thesaurus list which the operator of the information system is responsible for defining and extending, and in which the permitted attribute labels for the attributes of objects and/or relationships are specified.

An example of a simple thesaurus of attribute labels could be:
Surname
Pseudonym
Name of order
Maiden name
Divorced name
Christian name
First Christian name
Other Christian name By specifying a thesaurus, an operator ensures that different users employ similar attribute meanings in a similar way. This enhances subsequent attribute comparisons, as the danger of various attribute meanings being employed for one and the same attribute when they are entered, evaluated and output is either reduced or eliminated altogether.

If this type of thesaurus list is maintained, an entry (row) of the thesaurus list consists of the fields shown in FIG. 7, which have the following meaning:

Key Field of the Attribute Label '710': An unique key for the descriptor which is used as a reference for the descriptor (foreign key) if this descriptor is used in the table of attributes. This key can be structured using hierarchical classification and notation. An example could be: 1xxxxx Broader term of the 1st order 11xxxx 1st narrower term for the 1st order 111xxx 1st narrower term for the 1st narrower term of the 1st order etc.

The hierarchical classification and respective notation can be used in the evaluation of attributes to search using broader terms, with detailed narrower terms also being able to be used.

Label for the Attribute Meaning '720': In general, a statement on the meaning of the attribute which can be understood by the creator, processor and evaluator of the information (e.g. "surname" "place of birth", "vehicle manufacturer" etc.).

Labels in an Additional Language/Additional Languages '730' etc. In cases where information systems have to be maintained in several languages, the term of the attribute label can be specified in additional fields in one or several other languages or code forms. This enables users to toggle instantaneously between languages or to other meaning variants without changing the actual information contents of the attribute label (uniquely identified by means of the Key in '710').

In individual cases, the entry (row) for an attribute label can by extended by adding further Fields '740' etc., should this be deemed expedient or necessary on account of security or other requirements.

Another important feature of the invention is its capacity to enable the basic elements of the three above-mentioned element types (objects, relationships between objects and attributes for the description and/or identification of objects and/or the relationship) or the basic elements and the thesaurus lists allocated to them to be placed freely in relation to one another. These relationships are stored in their own physically or logically delimited storage areas, e.g. in database tables. One storage area of uniform structure exists for each link between two basic elements. In the case of databases, this is the link table.

A schematic illustration of how the system stores links between two basic elements is shown in FIG. 8. This takes as an example the link between objects, as shown in FIG. 2, and attributes, as shown in FIG. 5, in a Link Table '800'. Each Object '200' is identified by means of an unique Object Key '210/820'. The (descriptive or identifying) Attribute '500' is identified by means of its Attribute Key '510/830'. In Link Table '800', the Object Key '210/820' is brought together with the Attribute Key '510/830', which refers to the Object '210', in each entry (row).

The link between relationships and attributes is structured in a similar way. Relationship '400' is uniquely identified as in FIG. 4 by means of its Relationship Key '410'. The (descriptive or identifying) Attribute '500' is identified by means of its unique Attribute Key '500'. In Link Table '800', the Relationship Key '410' is brought together with the Attribute Key '510' which refers to the relationship, in each entry (row).

The link between objects has already been described in th e basic table of relationships, with reference to FIG. 4.

The invention enables any number of elements of a basic elements table to be linked with any number of elements of another basic elements table or thesaurus list (M:N links). A separate Key '810' can be used for the unique identification of an entry in the link table.

In addition to the key components of the linked elements, link tables may contain information describing or assessing the link itself in more detail in additional Fields '840'. This may include, for instance, information on the time at which this link was relevant ("When did an user borrow a book from the library?"). Information on the relevance and veracity of a link may also come into this category. This enables e.g. witness statements to be weighed up and assessed in a police information system.

Another sample application of the invention allows the source documents containing the information to be stored as separate objects.

These source documents may be e.g. documents containing text and graphics, sound, film, photographic or video documents and other source documents which are able to be stored electronically.

The invention enables these source documents to be entered electronically (direct entry or scanning of paper documents) and stored within the database system.

The efficiency of the database management system used is the sole factor determining the format and length of the source documents which are stored as separate "data records" within the database management system.

It also depends exclusively on the efficiency of the input and output devices used as to whether, and in what quality, the source documents can be entered, stored, processed and output.

A first important characteristic of source documents is that they or their contents are not intended for editing or processing by means of information technology using the described invention. Instead, in cases where information is required as proof of the source, they serve merely as documentary proof and as a reference to the source of the information (which may be relevant in a court of law).

Each source document is thus accompanied in the present invention by a management object, which is used to store and manage the required operator-specific management information on the source document itself.

FIG. 9 shows the link between source documents and the management objects which help to manage source documents, identify and describe them using any attributes and place them in any relation to one another.

A Logical or Physical Storage Area '910' is identified for the storage of source documents. Each source document consists of the actual document in Storage Field '912', and a Key Field '911', which is used as an unique key for this document field.

A Logical or Physical Storage Area '920' represents the management object of the allocated source document. The structure and function of the fields of Element '920' correspond with the structure and fields described in FIG. 2.

Storage Area '930' is responsible for the link between source documents and the management objects which manage and describe them. The key field of the source document from '910' is transferred as a foreign key to its Field '931', and the Key Field '921' of the management object from '920' is transferred as a foreign key to its Key Field '932'.

Another sample application of the invention enables references to the source documents containing the information to be stored even if they are unable to be stored electronically. This may be either due to organizational, or dp reasons etc., or because the material composition of the source documents does not render them suitable for electronic storage (e.g. pieces of evidence in a police information system).

The link between source documents and the management objects which describe and identify them, shown in FIG. 9, remains unaffected by the above. The Key Pointer '911' is not an internal system reference in this variant, but instead can be replaced by a reference to a storage location for the source document which is not within the system.

An overview of the data structure model previously developed is shown in FIG. 10. This Data Structure Model '1000' is also referred to as a partial system.

As already described in FIG. 4, the Objects '1020' stored in '1010' are related to each other. In accordance with FIG. 10, the Keys '1021' and '1022' of objects linked with each other are brought together in the Relationship Table '1010'.

In accordance with FIG. 9, Key '1021' of an Object '1020' and Key '1031' of an Attribute '1030' are brought together by means of Link Table '1040'.

Similarly, in Link Table '1050', the Key '1031' of an Attribute '1030' is brought together with the Key '1012' of a relationship between objects from '1010' by means of Link Table '1050'.

In order to avoid ambiguity when entering and allocating attribute terms, the allocation of individual or all attribute terms can be supported by a Thesaurus of Attribute Terms '1060'.

In order to avoid ambiguity when entering and allocating attribute meanings, the allocation of individual or all attribute meanings can be supported by a Thesaurus of Attribute Meanings '1070'.

In many information systems, it is not only necessary to distinguish between various object types, but also between various object classes containing object types which have to be processed in a similar way.

For instance, distinctions can be made in a library administration system between:

the managed media (titles of books, records, etc.), the library users/borrowers, the users of the library administration system etc.

Distinctions can be made in a merchandise management system between:

the managed retail articles, the suppliers of these articles, the customers for the articles and possibly the system users etc.

The main criterion used to define a new object class is the necessity of entering, storing processing, evaluating and outputting a group of object types (=object class) in the information system according to uniform criteria, i.e. of using general editing criteria for this object class. Organizational considerations, dp requirements (e.g. storage on various media), backup or technical security requirements (e.g. storage of person-related data) etc. may form the basis for general editing criteria of this kind.

In cases where such considerations entail the creation of several object classes for interaction with each other, another sample application of the invention provides the following option:

each object class is edited and processed in its own partial system;

the physical data structure of the partial systems representing the various object classes is identical insofar as this affects the basic structure of a partial system described above. Additional, or class-specific extensions can be made, e.g. for the "additional columns" described at several points above.

any required interaction between the objects from different object classes or partial systems is implemented by means of uniformly structured, edited and processed links between partial systems, as illustrated schematically in FIG. 11.

The general illustration of the data structure model in FIG. 11 depicts three Partial Systems '1110', '1120' and '1130' 'as examples, each of which is structured analogous to the partial system shown in FIG. 10.

The Object Basic Elements '1111', '1121' and '1131' are linked with each other by means of Link Tables '1140', 1150' and '1160' when two object classes or partial systems are linked.

The structure and processing of link tables between partial systems corresponds to the structure of link tables between basic element tables within a partial system, described in FIG. 4.

Each entry (row) in the link table of two object classes contains the link between an Object, e.g. '1111' from an Object Class or Partial System, e.g. '1110', with an Object, e.g. '1121' from an Object Class or Partial System '1120'. The Keys ('1111' or '1121') of the linked objects are generally stored in a Link Table, e.g. '1140'.

Additional fields can also be provided for in a Link Table, e.g. '1140', between object classes or partial systems (see FIG. 4), especially fields which describe the link depicted in an entry more closely, e.g.

define its relevance in terms of time, space, organization, define the type of existence of this link, etc.

The invention places no restrictions on the number of partial systems. The number is defined by the number of object classes which are subject to different processing rules. Nor does the invention restrict the number of partial systems, which are all linked in pairs with other partial systems.

Whereas prior art is oriented towards the business activity and data contents of the operator of the information system to be created and has defined its design rules accordingly, a main feature of the invention is that the business activity and data contents of the operator of the information system to be created are ignored in the first instance.

What is claimed is:

1. A process for creating a structure of stored data, said process being implemented in a database for storing data within a storage of an information system, wherein said database is accessed via a program running on a DP system, said process comprising:

creating a common storage area for storing a plurality of objects that are images of at least one of specific items or abstract items, wherein each of said objects is represented by an element that includes components that indicate at least a type and an identifier of said object;

creating a common storage area for storing a plurality of relationships between said objects, wherein each of said relationships between objects is represented by an element that includes components that indicate at least one of the identity of, and a reference to, the storage area of said objects;

creating a common storage area for storing a plurality of attributes used to describe at least one of said objects and said relationships between said objects, wherein each of said attributes is represented by an element that includes components that indicate at least one of a definition of said attribute and a reference term for said attribute;

creating a common storage area for storing a plurality of relationships between respective ones of said attributes and respective ones of said objects, wherein each of said relationships between a respective one of said attributes and a respective one of said objects is represented by an element that includes components that indicate at least one of the identity of, and a reference to, the storage area of said respective attribute and said respective object;

creating a common storage area for storing a plurality of relationships between respective ones of said attributes and said relationships between said objects, each of said relationships between a respective one of said attributes and a respective one of said relationships between said is represented by an element that includes components that indicate at least one of the identity of, or reference to, the storage area of said respective attribute and the identity of, or reference to, the storage area of said respective relationship between said objects;

wherein each of said storage areas is a physically or logically separated storage area including a sequence of equally structured elements that is each respectively referenced by at least one of a single or composed key-component or identifier.

2. A process according to claim 1, further comprising:

creating an additional common storage area for storing a plurality of unstructured data segments that include character sequences, graphical data, audio data, video data, or direct or indirect references to a storage location where a respective one of said data segments is physically stored; and creating at least one additional common storage area for at least one of storing relationships between said data segments and said objects and storing relationships between said data segments and respective ones of said relationships between said objects, wherein each of said relationships stored in said at least one additional common storage area is represented by an element that includes components that indicate at least one of the identity of a storage area of said object and a reference to said relationship between said objects respectively, and further indicate at least one of the identity of, or reference to, a storage area of a related one of said data segments;

wherein each of said additional common storage areas is a physically or logically separated storage area including a sequence of equally structured elements that are each respectively referenced by at least one of a single or composed key-component or identifier.

3. A process according to claim 1, wherein, with regards to creating said common storage area for storing a plurality of attributes to describe at least one of said objects and relationships between said objects, the element for each of said attributes includes additional components for the term of said attribute in textual, numerical, graphical, audio or video representation.

4. A process according to claim 1, further comprising:

creating additional common storage areas for storing thesaurus information including definitions of the types of said objects, definitions of said attributes, reference terms for said attribute and identifiers of said relationships between said objects;

wherein each of said additional common storage areas for storing thesaurus information is a physically or logically separated storage area including a sequence of equally structured elements that are each respectively referenced by at least one of a single or composed key-component or identifier.

5. A process according to claim 4, wherein the elements of each of said additional common storage areas for storing thesaurus information further include additional components representing said thesaurus information in at least one of different languages and representations.

6. A process according to claim 1, further comprising:

classifying a group of the types of said objects, according to equal criteria, into respective classes of objects;

creating a separate data structure including at least a storage area for objects for each of said classes of objects;

creating a common storage area for storing a plurality of relationships between objects of a first class of objects and a second class of objects, wherein each of said relationships between one of said objects of said first and second classes of objects, respectively, is represented by an element that includes components that indicate at least one of the identity of, and reference to, a storage area of the respective objects in said first and second classes of objects;

wherein each of said common storage areas for storing a plurality of relationships between objects of said first and second classes of objects is a physically or logically separated storage area including a sequence of equally structured elements that are each respectively referenced by at least one of a single or composed key-component or identifier.

7. A process according to any of claims 1, 2, 4 and 6, wherein each of said elements stored in each of said storage areas is extended by additional, equally structured components.

8. A process according to any of claims 1, 2, 4 and 6, wherein each of said storage areas is a physically or logically separated storage area.

9. A process according to any of claims 1, 2, 4 and 6, wherein each of said storage areas includes tables of a relational database.

10. A process according to any of claims 1, 2, 4 and 6, wherein said data structure of said database is accessed via a program executed on an EDP system.

11. A process according to any of claims 1, 2, 4 and 6, wherein said data structure of said database is used for at least one of input, storage, processing, evaluation, representation and output of at least one of said one or more objects, said attributes of said objects, said relationships and said data segments.

12. A process according to any of claims 1, 2, 4 and 6, wherein a program is executed to access said storage system.

13. A process according to any of claims 1, 2, 4 and 6, wherein a program is executed running on an EDP system to access said stored data.

* * * * *